United States Patent
Curello et al.

(10) Patent No.: US 6,628,919 B1
(45) Date of Patent: Sep. 30, 2003

(54) LOW-COST MULTI-MISSION BROADBAND COMMUNICATIONS PAYLOAD

(75) Inventors: Charles Curello, Torrance, CA (US); Scott P. Barnes, Pacific Palisades, CA (US); Barry Fishman, San Pedro, CA (US); Harold A. Rosen, Santa Monica, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/636,394

(22) Filed: Aug. 9, 2000

(51) Int. Cl.[7] .............................................. H04B 7/185
(52) U.S. Cl. ..................... 455/12.1; 455/427; 455/13.4; 455/429; 370/316
(58) Field of Search ........................ 455/7, 69, 13.1, 455/13.4, 427, 428, 429, 430, 18, 20, 426, 12.1, 450, 418, 419; 370/316, 319, 323, 320, 347, 318

(56) References Cited

U.S. PATENT DOCUMENTS

| | | | | |
|---|---|---|---|---|
| 5,678,175 A | * | 10/1997 | Stuart et al. ............... | 455/13.1 |
| 5,898,680 A | * | 4/1999 | Johnstone et al. .......... | 370/316 |
| 6,064,883 A | * | 5/2000 | Smith ......................... | 455/428 |
| 6,085,067 A | * | 7/2000 | Gallagher et al. .......... | 455/13.1 |
| 6,091,934 A | * | 7/2000 | Berman et al. ............. | 455/13.4 |
| 6,157,840 A | * | 12/2000 | Hogberg et al. ............ | 455/452 |
| 6,226,493 B1 | * | 5/2001 | Leopold et al. ............ | 455/13.1 |
| 6,240,124 B1 | * | 5/2001 | Wiedeman et al. ......... | 375/130 |
| 6,266,329 B1 | * | 7/2001 | Lazaris-Brunner et al. . | 370/316 |
| 6,272,317 B1 | * | 8/2001 | Houston et al. ............ | 342/354 |
| 6,333,924 B1 | * | 12/2001 | Porcelli et al. ............. | 342/356 |
| 6,341,213 B1 | * | 1/2002 | Wu ............................ | 342/352 |

* cited by examiner

Primary Examiner—Nay Maung
Assistant Examiner—John J. Lee
(74) Attorney, Agent, or Firm—Gates & Cooper LLP (57) ABSTRACT

A method and system for communicating using satellites in a constellation in LEO, MEO or GEO orbits is disclosed. The system comprises a receive system, a downlink system, and a data processing system. The receive system receives an uplink signal comprising at least one data packet from at least one user in an uplink cell. The ground programmable downlink system transmits the data packet to a specific downlink cell and adjusts a power used to transmit the data packet to the specific downlink cell. The ground programmable data processing system processes and routes the data packet to an input of the downlink system such that the downlink system transmits the data packet to the specified downlink cell. The method comprises receiving at the satellite an uplink signal comprising at least one data packet from at least one user in an uplink cell, processing the data packet on the satellite, routing the data packet to a transmit antenna on the satellite, adjusting a power level of a transmitter used to transmit the data packet from the satellite to a specific downlink cell, and transmitting the data packet to the specified downlink cell.

17 Claims, 5 Drawing Sheets

LOW-COST MULTI-MISSION BROADBAND COMMUNICATIONS PAYLOAD

BACKGROUND OF THE INVENTION

1. Field of the Invention

This invention relates in general to communications systems, and in particular a low-cost multi-mission broadband communications payload.

2. Description of Related Art

Communications satellites have become commonplace for use in many types of communications services, e.g., data transfer, voice communications, television spot beam coverage, and other data transfer applications. As such, satellites must provide signals to various geographic locations on the Earth's surface. As such, typical satellites use customized antenna designs to provide signal coverage for a particular country or geographic area.

Many satellite payloads contain analog or digital signal processors. Analog processors are typically used to separate and combine different signals into specific channels ("channelize the signals"), and to switch different parts of the ground-to-satellite ("uplink") signal to different satellite-to-ground ("downlink") beams. Digital processors are also used to channelize and switch signals, and may also be used to demodulate, process and remodulate signals. Usually these signal processors are heavy and consume a lot of DC power, so it is advantageous to be as efficient as possible in allocating processing resources to uplink beams.

Further, the signals ("traffic") in each uplink beam to the satellite are different, since the population and economy in each uplink region is different. If the amount of traffic in each uplink beam is known before the satellite is launched, and does not vary over the life of the satellite, processing resources can be allocated to uplink beams with fixed connections, which eliminates the need for the switch matrix. Typically, however, the amount of traffic in each uplink beam is either unknown beforehand or varies over time, and thus there must be some sort of switch matrix to reallocate and interconnect uplink beams to the on-board satellite processing resources. Similar traffic changes occur in downlink beams, with similar problems for the satellite and associated infrastructure to support users on the ground.

Communications satellites are operated in various modes. Some satellites operate as simple repeaters, typically known as a "bent-pipe" configuration, where the uplink signal is merely repeated, at a different frequency, in a downlink signal. No processor capability is available onboard the satellite other than frequency translation between the uplink and downlink signals, and, if necessary, amplification of the downlink signal to allow ground based receivers to receive the signal.

Multi-beam satellites were introduced to allow the satellite to receive signals from multiple sources and relay those signals to multiple destinations and take advantage of frequency reuse to increase system capability. In a multi-beam satellite, however, the ability of the satellite to relay a given uplink signal to a desired downlink destination was still limited.

To help to reduce this limitation, multi-beam satellites that have on-board switching capability have been deployed. These satellites receive an incoming beam containing several frequency-multiplexed channels, demultiplex (demux) the signal on-board the satellite, and inter-beam switch these channels into a desired downlink beam.

Satellite based broadband communications networks rely on highly efficient and flexible payloads which act as virtual nodes within the network. The satellite's payload provides connectivity among the network of user terminals on the ground and other satellites in the constellation, as well as the central network operations center. This connectivity allows data links to be established between any two points on the earth.

It can be seen, then, that there is a need in the art for a communications system that can support multiple missions without the need for redesigning the entire system. It can also be seen that there is a need in the art for a communications system that can be programmed in flight to accommodate the changing needs of uplink and downlink traffic.

SUMMARY OF THE INVENTION

To overcome the limitations in the prior art described above, and to overcome other limitations that will become apparent upon reading and understanding the present specification, the present invention discloses a method and system for communicating using satellites. The system comprises a receive system, a downlink system, and a data processing system. The receive system receives an uplink signal comprising at least one data packet from at least one user in an uplink cell. The ground programmable downlink system transmits the data packet to a specific downlink cell and adjusts a power used to transmit the data packet to the specific downlink cell. The ground programmable data processing system processes and routes the data packet to an input of the downlink system such that the downlink system transmits the data packet to the specified downlink cell.

The method comprises receiving at the satellite an uplink signal comprising at least one data packet from at least one user in an uplink cell, processing the data packet on the satellite, routing the data packet to a transmit antenna on the satellite, adjusting a power level of a transmitter used to transmit the data packet from the satellite to a specific downlink cell, and transmitting the data packet to the specified downlink cell.

The present invention provides a communications system that can support multiple missions without the need for redesigning the entire system. The present invention also provides a communications system that can be programmed in flight to accommodate the changing needs of uplink and downlink traffic.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Satellite based broadband communications networks rely on highly efficient and flexible payloads which act as virtual nodes within the network. The satellite's payload provides connectivity among the network of user terminals on the ground and other satellites in the constellation, as well as the central network operations center. This connectivity allows data links to be established between any two points on the earth. Flexibly switched demod banks utilize the minimum amount of spacecraft resources (mass and power) yet maximize flexibility. Switching flexibility allows reassignment of satellite resources to uplink cells experiencing higher demand at a given point in time.

A two-layer spherical lens, coupled with a satellite yaw concept, permits one dimensional scanning for the uplink system, greatly simplifying the secondary beamforming network (BFN). This allows the present invention to be used for MEO or LEO applications requiring very wide scan angles.

A Side Fed Offset Cassegrain (SFOC) reflector with a sidelobe canceling BFN can also be used for GEO applications where very wide scan angles (>30 degrees) are not required.

The uplink uses multiple spot beams, typically one hundred and twelve spot beams, that are constantly monitored by the spacecraft demodulator resources that provide coverage for uplink cells geographically distrubuted over the satellite coverage area. Each uplink cell operates on a fixed polarization. A four-cell reuse pattern is typically used to maximize capacity density, but other reuse patterns can be used within the scope of the present invention.

The system uses a regenerative satellite payload design. Packets arriving at the satellite are demodulated, buffered, and routed to the appropriate downlink destination queues and sequentially transmitted to the desired destination Small Terminals (STs). This demod/remod architecture enables full mesh connectivity, e.g., user terminal to user terminal, avoiding double hops to a central hub and the associated additional latency.

The downlink coverage subdivides each uplink cell into seven microcells. Twenty-four high-rate hopping beams service all downlink microcells. Downlink microcells operate in either polarization, but will be assigned a single polarization except in areas where there is a high-inbound capacity requirement. This approach, also known as "point-and-shoot," enables the satellite to take advantages of the peak gain available in each downlink beam for point-to-point transmissions. The present invention uses multiple downlink beams generated from a single phased array aperture to reduce satellite mass and total power dissipation. This takes advantage of the intermodulation (IM) dispersion concept, which reduces degradation due to IM distortion associated with multi-carrier operation. This results in significant power savings as amplifiers may be operated at saturation rather than backed off, as is normal practice when operating in multi-carrier mode.

The system is typically a Ka-band packet based transmission system offering bandwidth on demand connections in support of data, video, and other interactive services and applications. The system can be used in other frequency bands without departing from the scope of the invention. The combination of small terminal size, coupled with high throughput, makes this system ideal for users ranging from large corporations to small businesses, and consumer small-office/home office (SOHO) users. Raw data rates supported per single carrier are 16.384 Mbps, 2.048 Mbps, and 512 kbps, and can be higher or lower depending on the internal design of the payload of the present invention. A fallback mode, typically 128 Kbps, is also provided for improved availability of lower end ground-based terminal types. Interfaces into terrestrial networks, e.g., corporate data networks, allow seamless integration into existing communication system infrastructures.

Satellite System

Figure 1:
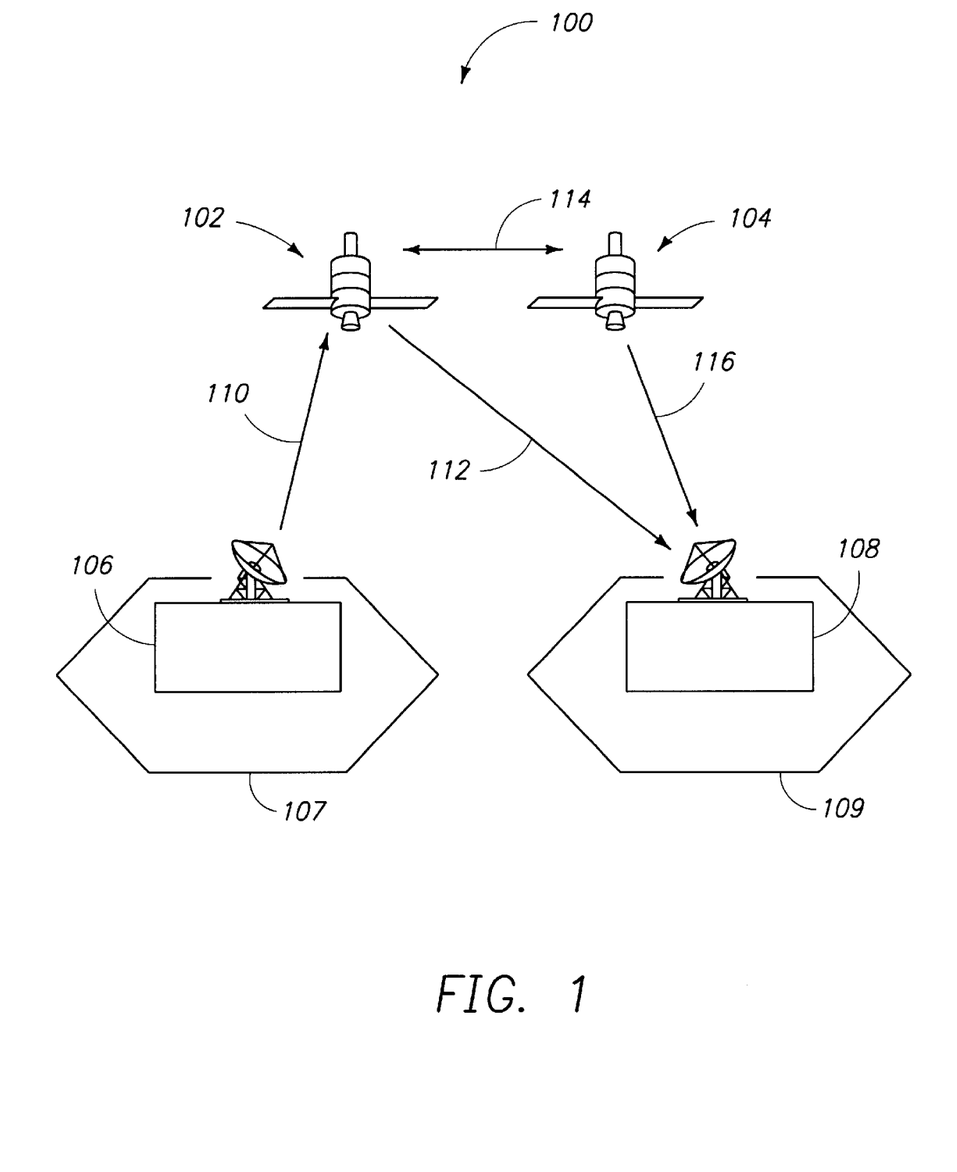
FIG. 1 illustrates a typical satellite communications system as used in the present invention.

FIG. 1 illustrates a typical satellite communications system as used in the present invention.

System 100 comprises satellites 102 and 104, which are used for communications links between user 106 in cell 107 and user 108 in cell 109. Cells 107 and 109 are not necessarily the same size for the uplink 110 and downlink 112 and 116; the downlink cells 109 can be larger or smaller than cells 107. Typically, cells 109 are smaller than cells 107, and are sometimes referred to as "microcells."

Although only two satellites 102 and 104 are shown as an illustration, a larger or smaller number of satellites 102 and 104 can be within the constellation of satellites 102 and 104 in system 100 without departing from the scope of the invention. Satellites 102 and 104 can be in any orbit, e.g., Low Earth Orbit (LEO), Mid-Earth Orbit (MEO), or geosynchronous orbit (GEO). Further, additional users 106 and 108 in the same cells 107 and 109, or different cells within the system 100, can be added to system 100 without departing from the scope of the present invention.

User 106 provides input to system 100 via uplink 110 to satellite 102. Depending on the terrestrial coverage that satellite 102 has, satellite 102 can either send data to user 108 directly via downlink 112 if satellite 102 can service a user 108 in cell 109, or can send data to user 108 through another satellite 104 in the constellation using crosslink 114 and downlink 116 where satellite 102 cannot service cell 109, but satellite 104 can provide service to cell 109. Data can travel in any direction on any of the links 110–116.

Payload Description

Figure 2A:
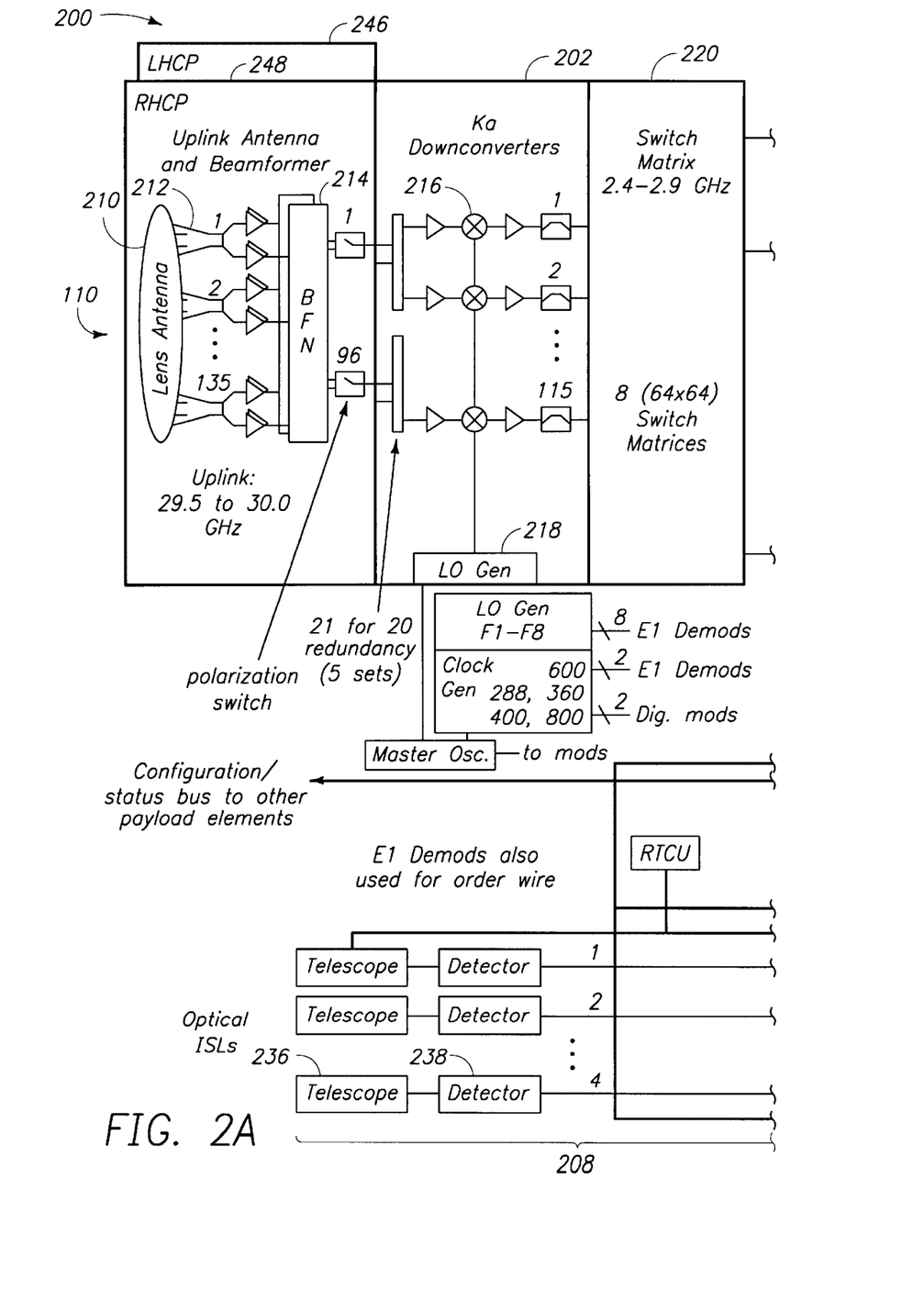
FIGS. 2A–2C illustrate the satellite payload of the present invention.
Figure 2B:
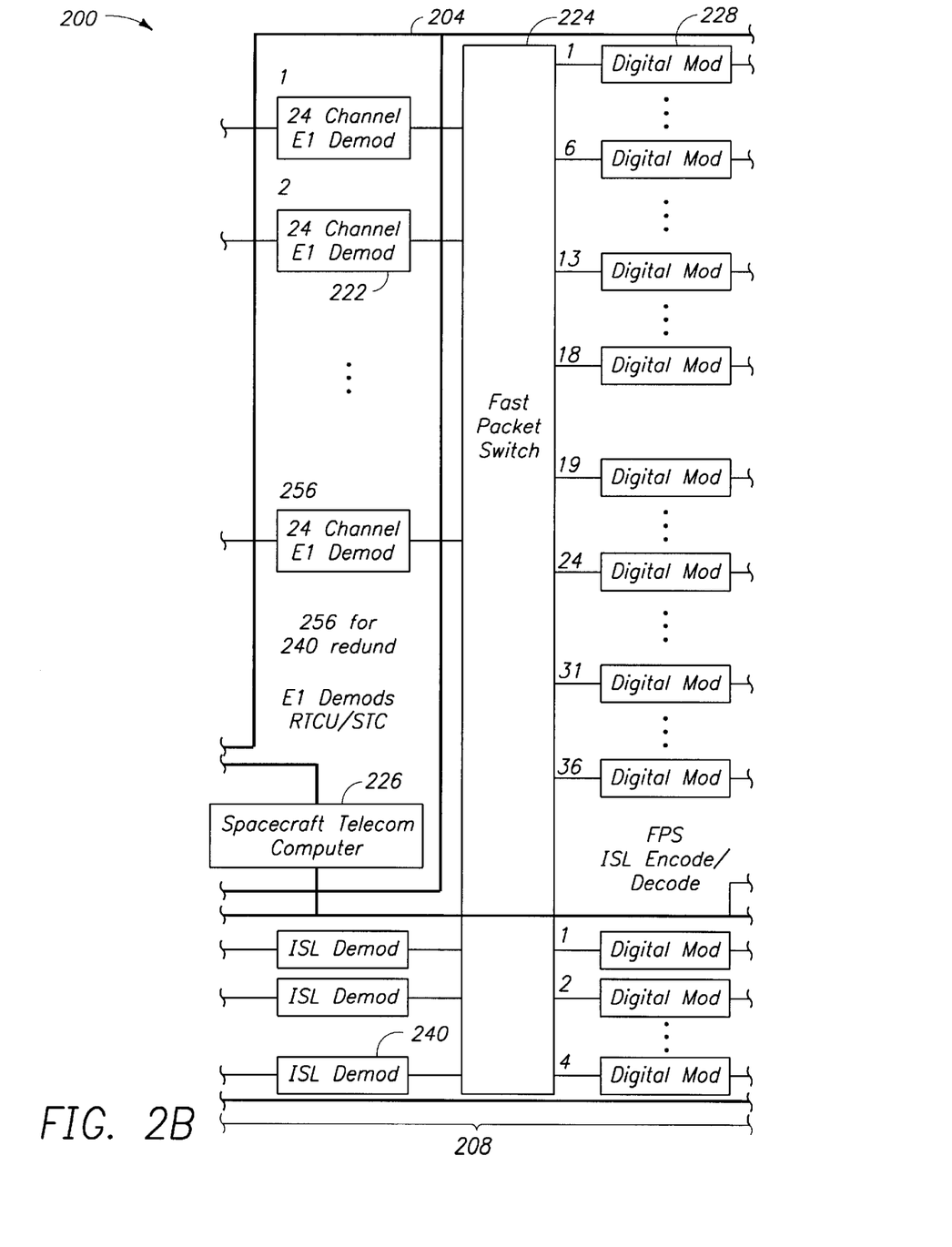
Figure 2C:
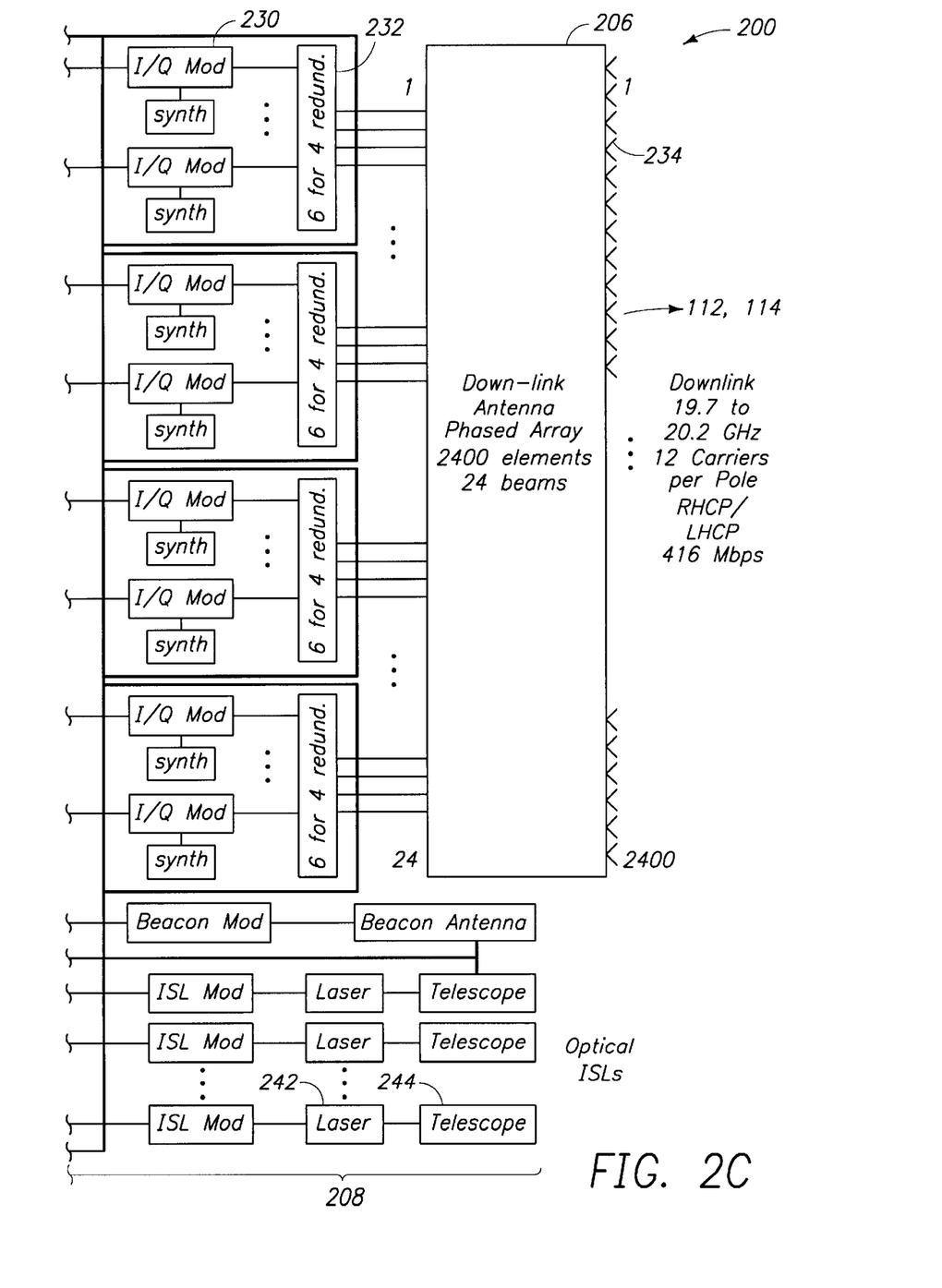

FIGS. 2A–2C illustrates the satellite payload of the present invention.

Functionally, the payload 200 may be divided into four main subsystems: the uplink receive section 202, a digital signal processor 204, a downlink transmit antenna subsystem 206, and an optical or radio frequency crosslink section 208.

Uplink Receive and Downconvert Subsystem

The uplink receive section 202 architecture comprises a multi-beam antenna 210 which receives the uplink signal 110 and forms a plurality of simultaneous dual polarization beams 212. The beamforming network (BFN) 214 then forms the beams for each polarized signal. Although shown using circular polarization, horizontal and vertical polarization signals may be used without departing from the scope of the present invention. Mixers 216 and oscillator 218 are used to downconvert and translate the uplink band down to an intermediate frequency (IF) band appropriate for digital processing. Each signal is then routed to demodulators via switch matrix 220. Switch matrix 220 can be a hard-wired switch matrix, a self-redundant switch matrix, a fully-connected switch matrix, or any combination of the above, in order to provide the flexibility of routing any given uplink beam 110 to any given downlink demodulator.

The uplink system 202 architecture supports multiple user terminal configurations. The satellite terminals supported range from receive only terminals that can use, for example, a 56K dial-up modem or equivalent for the back haul, to terminals capable of supporting approximately 50 Mbps per carrier uplinks 110. The basic terminal raw data rates that can be supported by system 200 are 128 Kbps, 512 Kbps, 2.0

Mbps, 16 and 64 Mbps, although other raw data rates can be supported by the present invention. Terminals with rates greater than a predetermined data rate, typically 512 Kbps, have the ability to fall back to a smaller data rate, typically one quarter of their base rate, to overcome occasional heavy rain fades. Outbound rates of 10 Mbps to 160 Mbps can also be supported. Terminals access the system via signalling channels operating at 512 or 128 Kbps.

Satellite Constellation

The present invention can be used in various constellations. LEO, MEO, and GEO are all possible constellation slots for the payload of the present invention. The constellation can comprise up to 12 satellites, where typically eight satellites are operational and four satellites are used as in-constellation spares. When the present invention is used in a GEO constellation, the satellites that use the present invention are typically in near-zero inclined, geosynchronous orbits. For LEO and MEO constellations, the number of satellites and orbital parameters can vary dependent on the highest latitude coverage desired and amount of satellite diversity required.

Digital Signal Processor

A digital signal processing subsystem 204 digitizes the IF input from switch matrix 220, demodulates the input using demodulators 222, and routes the data packets to users within the network via the fast packet switch 224. Payload command and control is also resident within the processor 226. Encoding of the data packets occurs in the modulators 228 and 230, and the inputs to the downlink system 206 are controlled through the redundancy matrices 232. Other functions such as antenna beam pointing, (uplink, downlink, and crosslink), bandwidth on demand (BoD) allocations, packet routing, downlink resource management, and payload power management are handled by the processors spacecraft telecommunications computer (STC) slice 226.

Downlink System

The downlink antennas 234 within the downlink system 206 provide multiple, typically 24, high data rate downlink beams 112 and 114 which are time division multiplexed among the downlink cells (typically five to ten times the number of uplink cells) within the satellite's footprint. The downlink system 206 is typically a phased array antenna with a large number of elements 234, typically two thousand, four hundred elements 234, which can form multiple beams simultaneously. A subset of the elements 234 are used to form apertures, which are used to then form the beams 112 and 114. These beams 112 and 114 are formed using between one and twelve downlink apertures. The number of apertures selected reflects the host satellite's ability to accommodate both the DC power draw as well as the thermal flux required to minimize thermal gradients across the element 234 arrays.

The downlink system 206 provides the ability to determine where the recipient user 108 is within the system, and delivers the data intended for user 108 only to cell 109, as opposed to every cell in the system 100. This is known as "point-and-shoot" resource management. The downlink system 206 assembles the packets that will be delivered to cell 109, or any particular cell within the system 200, with data that is meant only for the desired cell 109. This is called a "burst assembly" function. Further, downlink system 206 must also determine the cells within the system 100 that will not receive the data packet, called "stay-out regions." In order to deliver the data properly to the desired destination, downlink system 206 must determine if there is enough power to deliver the data packets, and, if there is any additional power remaining on board the satellite 102, to normalize the power across all of the beams generated by the apertures 234. The downlink system 206 also implements the routing and scheduling of the downlink data to appropriate time slots in the set of 24 independent and simultaneously moving TDM carriers.

The downlink system also must remove packets from the downlink apertures if the system cannot immediately deliver because of power constraints and/or timing issues. This "dequeuing function" operates in a round-robin fashion, over the downlink microcells 109, selecting bursts destined for each of the beams 112 and 116 per polarization based on the ability of the beams 112 and 116 to satisfy both distance and power checks. The starting point of the round-robin search is dynamically adjusted to ensure that each queue is visited approximately the same number of times. Distance checks between the simultaneous beams 112 are performed to avoid interference between the twelve co-polarized beams during each downlink 112 burst. Once a burst passes the distance check the required transmit power is read from the power table resident on the satellite 102. These tables are updated periodically by the NOCC based on weather data, e.g., NEXTRAD radar data, and terminal 108 measurements. Power checks are required to ensure that there is adequate power available for each selected downlink microcell 109, that the available satellite 102 power pool has not been exceeded, and to normalize the transmitted power up to the desired operating point. The normalization is required to maintain a constant operating point for the SSPA's resident in the downlink section 206. The power control allocates power to downlink cells 109 that are in rain-faded regions and the balance of the excess downlink power is distributed evenly among the remaining cells 109 that are in clear-sky conditions.

The system 200 accommodates N Gbps, where N is between 1 and 12, of capacity through the reuse of the available Ka-band spectrum. Frequency reuse in system 200 is supported via both spatial and polarization reuse. The system uses circular polarization inputs 246 and 248, either circular or linear, to simplify user terminal 106 and 108 installation and alignment with satellites 102 and 104. Spatial reuse occurs when two satellites 102 and 104 have similar coverage areas, and uplink signals 110 can be assigned to specific satellites 102 or 104. This reuse of signal bandwidth and polarzation provides substantial, sometimes up to twenty-five times, capacity increases for system 100 in both the uplink 110 and downlink 112 and 116 links.

Crosslink System

Finally, the optional crosslink subsystem 208, which can be either an optical system as shown in FIG. 2, or a radio frequency (RF) equivalent system, provides the interconnectivity between satellites 102 and 104 within the constellation. This interconnectivity between satellites in the constellation provides low latency connectivity between geographically distant users 106 and 108. The crosslink 114 configuration provides connectivity to satellites 102 and 104 in different orbital slots or planes in the case of MEO or LEO constellations.

Typically the crosslink system 108 comprises a receiver, in this case a telescope 236 and a detector 238, and a demodulator 240, where the demodulator 240 is similar to the demodulator 222. The signals are passed through the fast packet switch 224, and modulated with modulators 228, and retransmitted through a transmitter, in the case of an optical system, a laser 242, and an antenna, in the case of an optical system a telescope 244. The signal flow for the crosslink system 108 provides connectivity between cells where one of the cells is outside the satellite field of view, and also provides connectivity between satellites in two different orbital slots.

The payload system 200 primary transmission function provides full mesh (full constellation point-to-point) connectivity to the entire coverage area for each satellite 102 and 104 in the constellation. When operating in the point-to-point mode the payload 200 receives an uplink 110, containing a data packet, from an uplink cell 107 or another satellite and routes it only to the downlink cell 109 in which the destination terminal 108 is located, or directs the data packet to another satellite via the packet switch.

The payload system 200 is also capable of replicating and routing a packet to as many as forty multiple downlink cells for point-to-multi-point applications. Each user terminal 108 within a downlink microcell 109 listens to all packets from the payload and only processes those packets addressed to the specific terminal 108. Each satellite 102 transmits packets from/to a predetermined coverage area. There are also two Continental United States (CONUS) broadcast beams, one for each polarization, that simultaneously cover all or a subset of the CONUS coverage area. To facilitate link closure, a lower modulation symbol rate is used. Crosslinks 114 provide low latency mesh connectiviy between users 106 and 108 accessing the network from different satellites 102 and 104.

Process Chart

Figure 3:
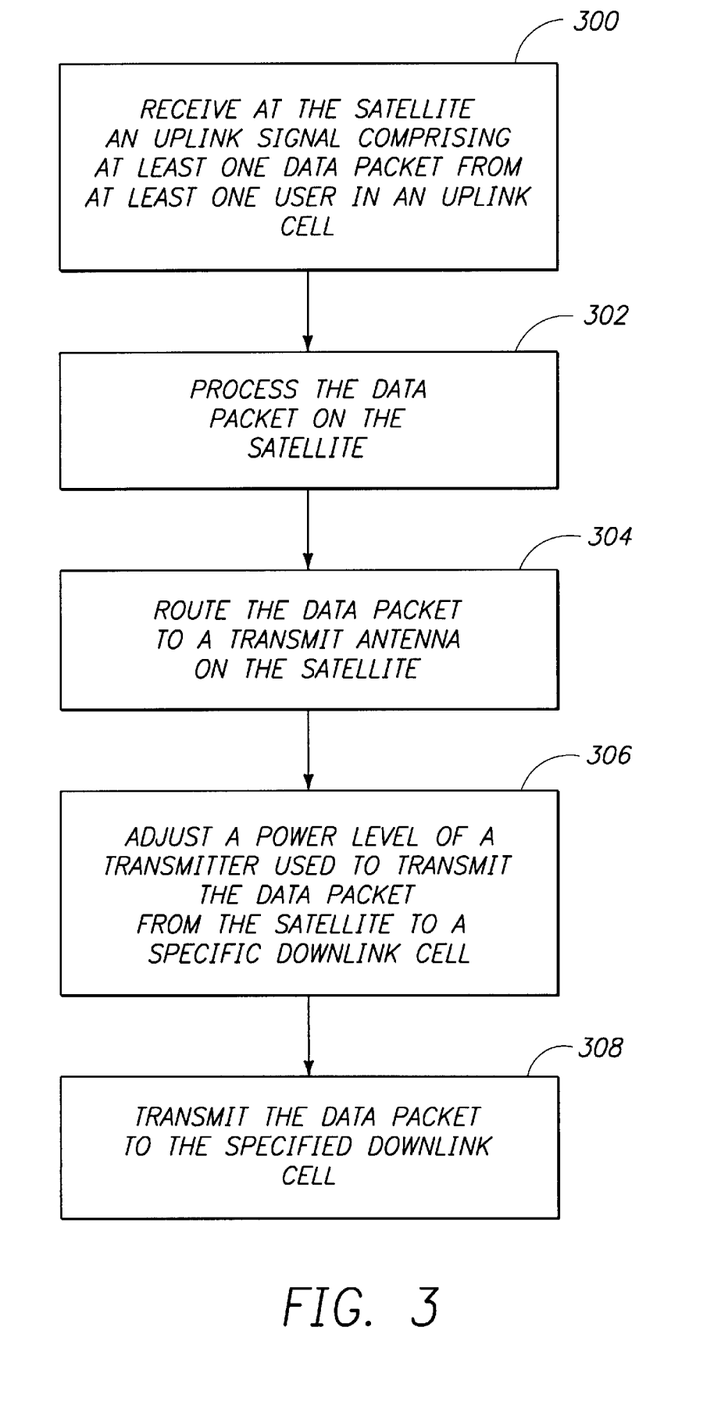
FIG. 3 is a flow chart illustrating exemplary steps used to practice the present invention.

FIG. 3 is a flow chart illustrating exemplary steps used to practice the present invention.

Block 300 illustrates performing the step of receiving at the satellite an uplink signal comprising at least one data packet from at least one user in an uplink cell.

Block 302 illustrates performing the step of processing the data packet on the satellite.

Block 304 illustrates performing the step of routing the data packet to a transmit antenna on the satellite.

Block 306 illustrates performing the step of adjusting a power level of a transmitter used to transmit the data packet from the satellite to a specific downlink cell.

Block 308 illustrates performing the step of transmitting the data packet to the specified downlink cell.

Conclusion

This concludes the description of the preferred embodiment of the invention. The following paragraphs describe some alternative methods of accomplishing the same objects. The present invention, although described with respect to two satellites, can be used with a larger or smaller number of satellites in the constellation. The power management functions of equalization and increasing the power to a specific downlink cell can be performed by other systems, including the data processing system. The power management system can also receive updates based on weather data on a continuous basis. Further, other transmitter and receiver systems, and other frequency bands, such as Ku-band, X-band, or other frequency bands may be used with the present invention to accomplish substantially the same functions as described herein.

In summary, the present invention discloses a method and system for communicating using satellites. The system comprises a receive system, a downlink system, and a data processing system. The receive system receives an uplink signal comprising at least one data packet from at least one user in an uplink cell. The ground programmable downlink system transmits the data packet to a specific downlink cell and adjusts a power used to transmit the data packet to the specific downlink cell. The ground programmable data processing system processes and routes the data packet to an input of the downlink system such that the downlink system transmits the data packet to the specified downlink cell.

The method comprises receiving at the satellite an uplink signal comprising at least one data packet from at least one user in an uplink cell, processing the data packet on the satellite, routing the data packet to a transmit antenna on the satellite, adjusting a power level of a transmitter used to transmit the data packet from the satellite to a specific downlink cell, and transmitting the data packet to the specified downlink cell.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for providing a communications link between diverse geographic users, using a constellation of satellites comprising at least one satellite in the constellation, comprising:

a receive system, located on the satellite, for receiving an uplink signal comprising at least one data packet from at least one user in an uplink cell;

a ground programmable downlink system, located on the satellite, wherein the ground programmable downlink system transmits the data packet to a specific downlink cell and other data packets to other downlink cells with a phased array antenna and adjusts a power used to transmit the data packet to the specific downlink cell, the downlink system comprising a power management system for providing additional power to specific downlink cells and for equalizing remaining transmitter power across substantally all remaining downlink cells; and a ground programmable data processing system, located on the satellite and coupled between the receive system and the downlink system, for processing the data packet and routing the data packet to an input of the downlink system such that the downlink system transmits the data packet to the specified downlink cell.

2. The system of claim 1, further comprising a crosslink system, wherein the crosslink system communicates between a first satellite and a second satellite in the constellation.

3. The system of claim 2, wherein the crosslink system is an optical system.

4. The system of claim 2, wherein the crosslink system is a radio frequency system.

5. The system of claim 1, wherein the specified downlink cell is only one downlink cell in the system.

6. The system of claim 1, wherein the specified downlink cell is more than one cell in the system.

7. The system of claim 1, wherein the uplink system receives signals from multiple types of user terminals.

8. The system of claim 1, wherein the uplink system receives uplink beams of more than one polarzation.

9. The system of claim 1, wherein the uplink system comprises a multibeam antenna for receiving multiple uplink beams.

10. The system of claim 1, wherein the power management system provides additional power to specific downlink cells based on updatable weather data.

11. The system of claim 1, wherein the data processing system comprises a router to route a given uplink signal to at least one selected downlink cell.

12. The system of claim 1, wherein the constellation of satellites is positioned in an orbit selected from a group comprising:

a Low Earth Orbit; and a Mid-Earth Orbit.

13. The system of claim 1, wherein the data processing system dequeues data packets from the downlink system according a power constraint.

14. The system of claim 1, wherein:

the data packet is transmitted to the specified downlink cell via a first beam; and the data processing system dequeues data packets from the downlink system according to a distance between the first beam and another beam.

15. A method for communicating using a satellite, comprising:

receiving, at the satellite, an uplink signal comprising at least one data packet from at least one user in an uplink cell;

processing the data packet on the satellite;

routing the data packet to a transmit antenna on the satellite;

adjusting a power level of a transmitter used to transmit the data packet from the satellite to a specific downlink cell; and transmitting the data packet to the specified downlink cell via a phased array antenna;

wherein the data packet is transmitted to the specified downlink cell by a downlink system including the phased array antenna, and the method further comprises the step of dequeing data packet from the downlink system according to a power constraint.

16. The method of claim 15, wherein the adjustment of the power level is performed using updatable weather data.

17. A method for communicating using a satellite, comprising:

receiving, at the satellite, an uplink signal comprising at least one data packet from at least one user in an uplink cell;

processing the data packet on the satellite;

routing the data packet to a transmit antenna on the satellite;

adjusting a power level of a tansmitter used to trasmit the data packet from the satellite to a specific downlink cell; and transmitting the data packet to the specified downlink cell via a phased array antenna;

wherein the data packet is transmitted to the specified downlink cell by a downlink system via a first beam, and the data processing system dequeues data packets from the downlink system according to a distance between the first beam and another beam.

* * * * *